(12) United States Patent
Nakamura et al.

(10) Patent No.: US 6,442,446 B1
(45) Date of Patent: Aug. 27, 2002

(54) CONTROL APPARATUS

(75) Inventors: Tsuyoshi Nakamura, Tama; Satoshi Tochiori, Kawagoe, both of (JP)

(73) Assignee: Tokyo Electron Limited, Tokyo (JP)

( * ) Notice: Subject to any disclaimer, the term of this patent is extended or adjusted under 35 U.S.C. 154(b) by 0 days.

(21) Appl. No.: 09/220,891

(22) Filed: Dec. 28, 1998

(30) Foreign Application Priority Data

Dec. 29, 1997 (JP) .............................. 9-368423

(51) Int. Cl.[7] .............................................. G06F 19/00
(52) U.S. Cl. ........................ 700/121; 700/3; 707/203; 707/511
(58) Field of Search .......................... 700/3, 121, 150, 700/204, 244, 96, 181; 707/203, 204, 511

(56) References Cited

U.S. PATENT DOCUMENTS

| 4,558,413 A | * | 12/1985 | Schmidt et al. | 707/203 |
| 5,499,365 A | * | 3/1996 | Anderson et al. | 707/203 |
| 5,565,114 A | * | 10/1996 | Saito et al. | 216/60 |
| 5,574,898 A | * | 11/1996 | Leblang et al. | 707/1 |
| 5,675,802 A | * | 10/1997 | Allen et al. | 707/203 |
| 5,947,675 A | * | 9/1999 | Matsushima | 414/416 |
| 6,000,830 A | * | 12/1999 | Asano et al. | 700/121 |
| 6,023,710 A | * | 2/2000 | Steiner et al. | 707/203 |
| 6,112,024 A | * | 8/2000 | Almond et al. | 707/204 |
| 6,233,492 B1 | * | 5/2001 | Nakamura et al. | 700/2 |
| 6,263,497 B1 | * | 7/2001 | Maeda et al. | 717/11 |

FOREIGN PATENT DOCUMENTS

| JP | 63-54617 | 3/1988 |
| JP | 1-229325 | 9/1989 |
| JP | 4326423 | 11/1992 |
| JP | 56270 | 1/1993 |
| JP | 5-274335 | 10/1993 |

* cited by examiner

*Primary Examiner*—Leo Picard
*Assistant Examiner*—Kidest Bahta
(74) *Attorney, Agent, or Firm*—Pillsbury Winthrop LLP

(57) ABSTRACT

A control apparatus includes a version information collection section for collecting version information based on a user's specification from a plurality of programs including a program for controlling substrate processing equipment for processing a substrate, a version information file for storing the version information collected by the version information collection section, and a display for displaying the version information.

24 Claims, 4 Drawing Sheets

CONTROL APPARATUS

BACKGROUND OF THE INVENTION

The present invention relates to a control apparatus for use in process control of substrate processing equipment such as cluster tool equipment.

An apparatus for executing a number of processes in combination, such as substrate processing equipment of a semiconductor manufacturing machinery for processing a semiconductor substrate and that of a LCD manufacturing machinery for processing an LCD substrate, is very complicated in process control. A control system is therefore usually constituted of a master control unit (EC=equipment controller) and a plurality of slave control units (MCs= machine controllers) each controlled by the master control unit, and process control such as the sequence and recipe of a machine is executed by the MCs. This process control is carried out by a plurality of programs having their respective functions. For example, a program for controlling display and input, i.e., a program for managing a log or a program for executing a job is executed by the master control unit. Moreover, the process control for controlling the sequence and recipe according to a process is performed by a program.

Since the foregoing programs of MC process control are each upgraded at a user's request, there are programs of different versions in a single piece of substrate processing equipment. The programs of the EC process control may also be upgraded. However, when there are programs of different versions, the matching (compatibility) among programs becomes poor to increase in error. It is thus necessary to support a user against such an error, for example, to install a program of new version.

If, however, each program is upgraded at a user's request, there are programs of different versions for the respective users. It is thus difficult for a supporter to grasp which user uses a program of what version and it is desirable to inform a supporter of version information of each program.

Unlike the recent computer using an OS (operating system) of GUI (graphical user interface) environment, the programs other than the above-described programs for controlling the display and input, which are included in the programs used for process control of the substrate processing equipment, cannot be recognized on the screen by a user; therefore, it is very difficult for the user to know version information of these programs.

BRIEF SUMMARY OF THE INVENTION

An object of the present invention is to provide a control apparatus capable of receiving version information of a program which cannot be recognized on the screen of a display.

Another object of the present invention is to provide a control apparatus capable of easily obtaining version information of a program which causes an error.

Still another object of the present invention is to provide a control apparatus capable of receiving correct version information at all times.

According to a first aspect of the present invention, there is provided a control apparatus comprising a version information section for receiving version information from a plurality of programs including a program for controlling substrate processing equipment for processing a substrate, the version information being different from one another in accordance with a user's specification, a version information storage section for storing the version information received from the version information section, and a display section for displaying the version information stored in the version information storage section.

The control apparatus of the present invention further comprises an error information section for receiving error information of an error caused when each of the plurality of programs is executed, and an error information storage section for storing the error information received from the error information section.

In the control apparatus of the present invention, the display means displays the error information and the version information corresponding thereto read out from the error information storage section.

In the control apparatus of the present invention, when a program is updated, version information is obtained from the program and stored in the version information storage section.

According to a second aspect of the present invention, there is provided a control apparatus comprising a master control section for executing a plurality of programs including a program for controlling substrate processing equipment for processing a substrate, and a plurality of slave control sections controlled individually by the master control section. The master control section includes a version information section for obtaining version information from a plurality of programs, a version information storage section for storing the version information received from the version information section, and a display section for displaying the version information.

According to a third aspect of the present invention, there is provided a control apparatus comprising a control section for executing a plurality of programs including a program for controlling substrate processing equipment for processing a substrate, and at least one peripheral device for executing a program in association with the control section to control the substrate processing equipment, wherein the control section includes a version information section for obtaining version information from the plurality of programs and the program executed by the peripheral device, the version information being different from one another in accordance with a user's specification, a storage section for storing the version information received from the version information section, and a display section for displaying the version information.

In the present invention, version information is obtained from each program and stored in a storage section, and the stored version information is displayed when necessary. It is thus possible to easily know version information of a program which causes an error.

Since version information corresponding to error information is displayed, version information of a program which causes an error, can easily be obtained.

When a program is upgraded, version information is obtained from the program and then stored. Therefore, correct version information can be obtained at all times.

Since version information of a control section for controlling substrate processing equipment and that of a peripheral device operated in association with the control section are managed, the matching of applications between the control section and peripheral device can easily be achieved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings; which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will now be described with reference to the accompanying drawings.

Figure 1:
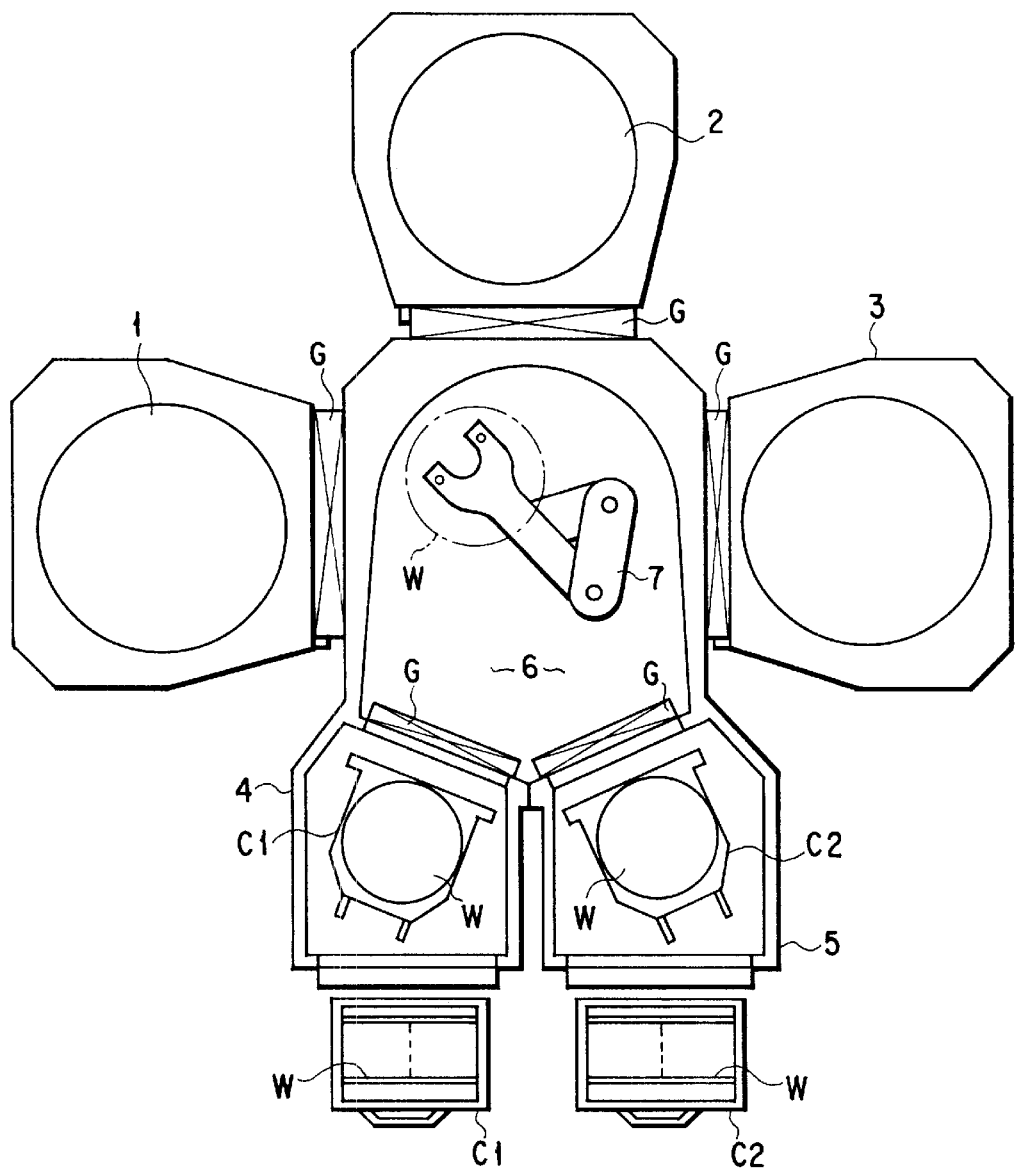
FIG. 1 is a plan view of the constitution of the entire semiconductor wafer processing apparatus according to a first embodiment of the present invention.

FIG. 1 is a plan view illustrating the constitution of a semiconductor wafer processing apparatus according to a first embodiment of the present invention.

The semiconductor wafer processing apparatus includes a plurality of process chambers, e.g., three process chambers 1, 2 and 3 for subjecting various processes, such as a CVD (chemical vapor deposition) process, a sputtering process, an etching process and a thermal oxidation process, to a semiconductor wafer, cassette chambers 4 and 5 having their respective cassettes C1 and C2 for holding a number of wafers, e.g., twenty-five wafers W, and a transfer chamber 6 for transferring the wafers W between the process chambers 1, 2 and 3 and the cassette chambers 4 and 5. The chambers are coupled to each other by means of a gate valve G such that the gate valve can freely be opened and closed. The transfer chamber 6 includes a multi-joint type transfer arm 7 which can be bent and rotated. This transfer arm 7 allows the wafers W to be transferred between the chambers. When the cassettes C1 and C2 are taken in the cassette chambers 4 and 5, they are reversed 90 degrees and the wafer insertion/removal opening of the cassettes C1 and C2 are rotated so as to face the center of the transfer chamber 6, with the result that the wafers W are positioned so as to be taken in and out by the transfer arm 7.

Figure 2:
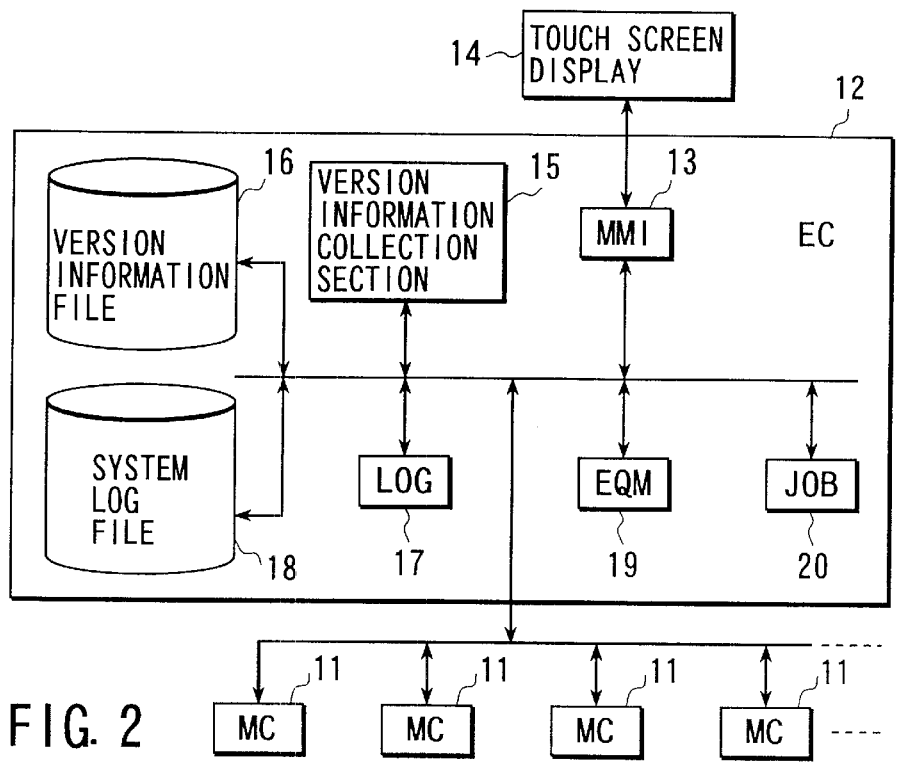
FIG. 2 is a block diagram of a control apparatus for controlling the semiconductor wafer processing apparatus illustrated in FIG. 1.

FIG. 2 is a block diagram of a control apparatus for controlling the semiconductor wafer processing apparatus.

Machine controllers (MC) 11 execute programs for individually controlling the process chambers 1, 2 and 3, cassette chambers 4 and 5, and transfer chamber 6. These machine controllers are controlled together by a main controller (EC) 12 as a master controller.

The main controller (EC) 12 includes a man machine interface section (MMI) 13 for executing programs for interfacing with a touch screen display 14, a version information collection section 15 for executing programs for collecting version information, a log management section 17 for executing programs for collecting log information from inside the system, an EQM section 19 for executing programs for controlling the respective machine controllers (MC) 11, and a job execution section 20 for executing programs for a job.

The main controller (EC) 12 has a version information file 16 for storing the log information collected by the version information collection section 15 and a system log file 18 for storing the log information collected by the log management section 17.

Since the man machine interface section (MMI) 13 executes the programs for interfacing with a user, the same program can be recognized on the screen of the touch screen display 14. Consequently, the user can know the version information of the man machine interface section (MMI) 13 on the screen.

On the other hand, the programs executed by any other than the man machine interface section (MMI) 13 or the programs executed by the machine controllers (MC) 11, version information collection section 15, log management section 17, EQM section 19, and job execution section 20 are programs hidden behind the man machine interface section (MMI) 13 or programs which cannot be recognized by the screen of the touch screen display 14. Therefore, a user cannot know directly the version information of the programs from the screen of the display 14.

Figure 3:
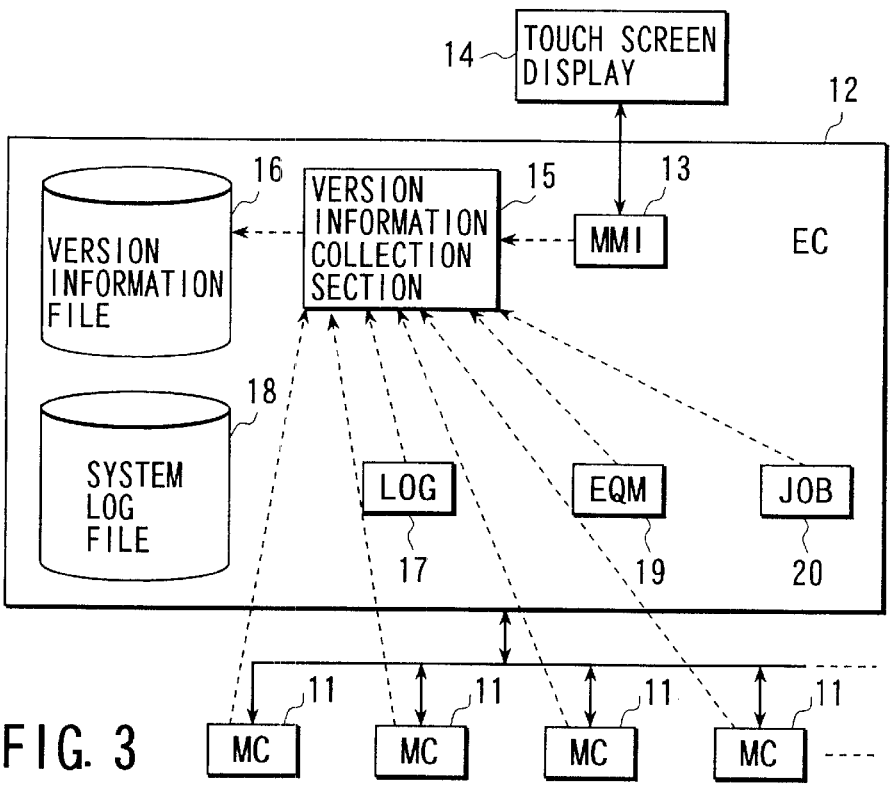
FIG. 3 is a block diagram for explaining an operation of a version information collection section of the control apparatus shown in FIG. 2.

FIG. 3 is a block diagram for explaining an operation of the version information collection section 15.

The section 15 receives version information from the programs to be executed by the machine controllers (MC) 11, man machine interface section (MMI) 13, log management section 17, EQM section 19, and job execution section 20, in response to a user's command input through, e.g., the touch panel display 14, and stores version information of each program in the version information file 16. This version information storing operation can be performed in the adjustment of the apparatus when it is shipped from a factory.

The version information collection section 15 can receive and store the version information from each program when the program is updated, with the result that correct version information can always be collected.

Figure 4:
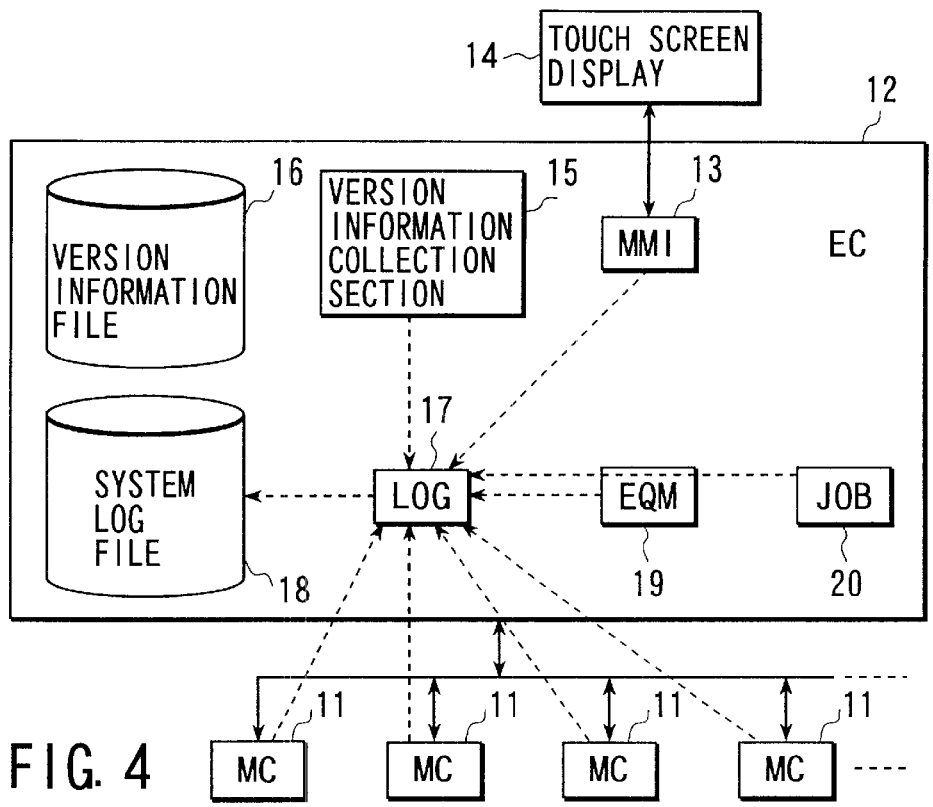
FIG. 4 is a block diagram for explaining an operation of a log management section of the control apparatus shown in FIG. 2.

FIG. 4 is a block diagram for explaining an operation of the log management section 17.

The section 17 obtains log information from the programs to be executed by the machine controllers (MC) 11, man machine interface section (MMI) 13, version information collection section 15, EQM section 19, and job execution section 20, and stores log information of each program in the system log file 18. Since the log information is filed for each program, a user is able to specify which program includes desired log information.

Since, furthermore, the log information includes error information caused on the programs, the log management section 17 has a function of an error information receiving means. According to this function, when the machine controllers (MC) 11, man machine interface section (MMI) 13, version information collection section 15, EQM section 19 or job execution section 20 causes an error, it sends the content of the error to the log management section 17. The contents of errors of all the sections can thus be recorded in the log management section 17. If, therefore, only the error information is extracted from the log management section 17, it can be easily discovered and specified and, in other words, a user can know by the log management section 17 which section causes what error.

Figure 5:
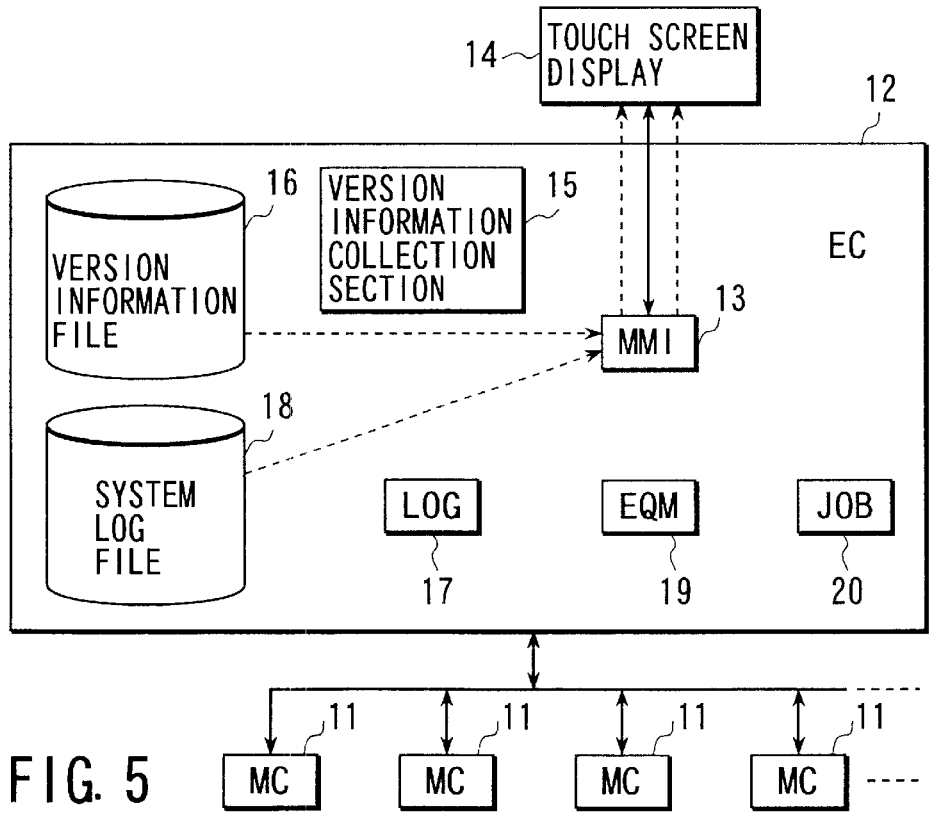
FIG. 5 is a block diagram for explaining an operation of a man machine interface (MMI) section of the control apparatus shown in FIG. 2.
Figure 6:
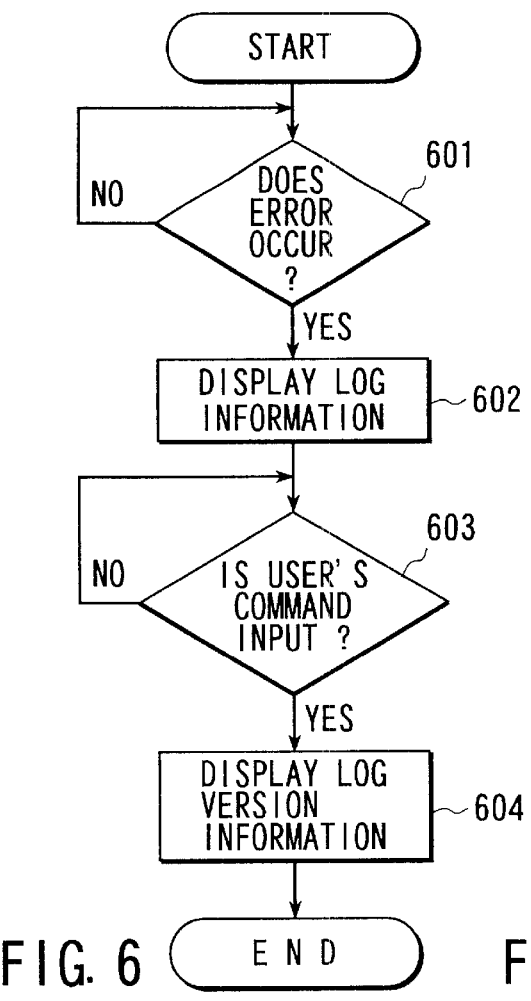
FIG. 6 is a flowchart for explaining an operation of the man machine interface section.

FIG. 5 is a block diagram for explaining an operation of the man machine interface section (MMI) 13, and FIG. 6 is a flowchart thereof.

When an error occurs in a program (step 601), the man machine interface section (MMI) 13 reads log information from the system log file 18 in response to a user's command or automatically and displays its contents on the touch panel display 14 (step 602). Thus, a user can know in which program the error occurs.

When a user's command is input (step 603), the man machine interface section (MMI) 13 reads version information from the version information file 16 and displays its contents on the touch panel display 14 (step 604). Thus, the user can know version information of each program.

Consequently, the user is able to know version information of a program in which an error occurs even though the program cannot be recognized on the screen from the log information (error information) and version information. For example, if the information is transmitted to a remote user's supporter, the supporter can replace the program in which an error has occurred with a program of new version compatible with another program, making it possible to deal with the program promptly and accurately.

The program of new version can be provided using, for example, a recording medium and a communication medium. Moreover, information can be exchanged between the user and supporter sides not through a person but mechanically using a communication line and a personal computer.

Figure 7:
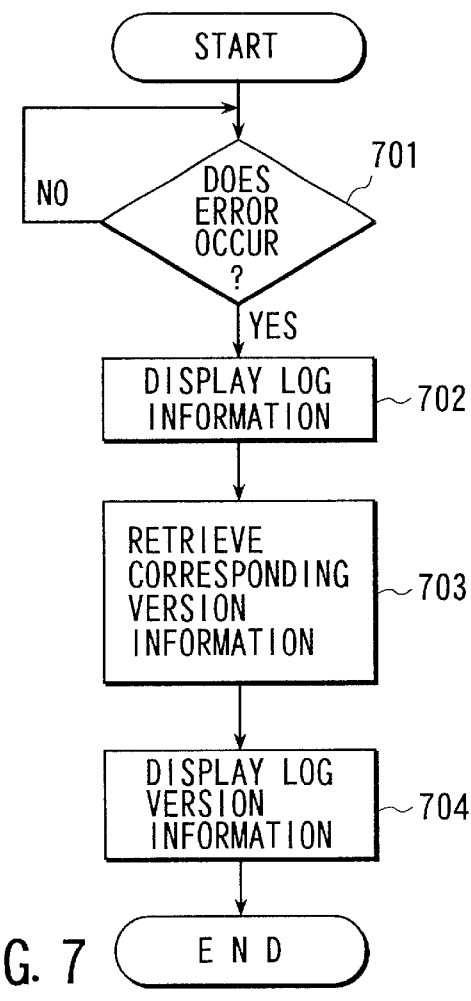
FIG. 7 is a flowchart for explaining a semiconductor wafer processing apparatus according to a second embodiment of the present invention.

FIG. 7 is a flowchart showing a modification to the operation of the man machine interface section (MMI) 13.

When an error occurs in a program (step 701), the man machine interface section (MMI) 13 reads log information from the system log file 18 in response to a user's command or automatically and displays its contents on the touch panel display 14 (step 702). The section 13 also specifies the program in which the error has occurred and retrieves and reads its corresponding version information from the version information file 16 (step 703) and displays its contents on the touch panel display 14.

Since, in this modification, the version information corresponding to the error information is displayed, the version information of a program causing an error can easily be obtained.

Figure 8:
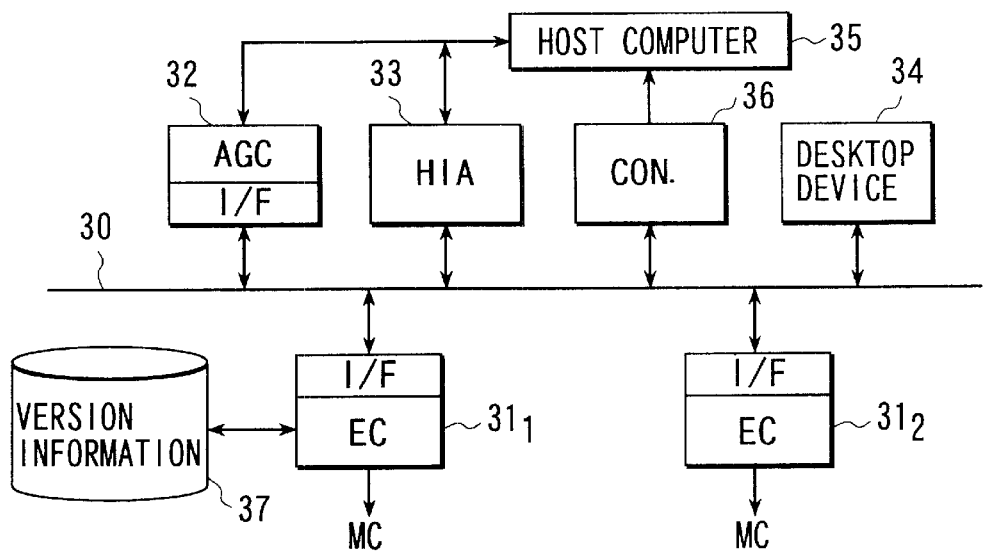
FIG. 8 is a block diagram of a control apparatus for controlling the semiconductor wafer processing apparatus according to the second embodiment of the present invention.

FIG. 8 illustrates a control apparatus according to a second embodiment of the present invention, for managing version information of option devices which accord to a user's specification, for example.

According to the second embodiment, ECs (equipment controllers) $31_1$ and $31_2$ are connected to a network 30 via an interface I/F, an AGC (advance group controller) 32, an HIA (host interface adapter) 33 and a desktop device 34 are connected to the network 30, and a host computer 35 is connected to the AGC 32 and HIA 33 and to the network 30 through a converter 36.

A version information file 37 is connected to the EC $31_1$ and capable of receiving version information from the AGC 32, HIA 33 and desktop device 34. The AGC 32 has a function of editing recipe information received from outside, and the desktop device 34 is capable of editing and displaying recipe information received from the EC $31_1$ or $31_2$. The HIA 33 serves as an interface of the host computer 35, and the converter 36 has a function of converting a message of the host computer 35 into a data format of the ECs $31_1$ and $31_2$.

In the second embodiment, the AGC 32, HIA 33 and desktop device 34 exchange information with the ECs $31_1$ and $31_2$. For example, the desktop device 34 receives recipe information from the EC $31_1$, edits it, and sends the edited information to the EC $31_2$. The host computer is capable of supplying a message to the ECs $31_1$ and $31_2$ through the converter 36.

For the above information exchange, it is necessary to match software between the interface of AGC 32 and HIA 33 and that of ECs $31_1$ and $31_2$. The version of the software is received and stored in the version information file 37. If, as described above, the version information of software (programs) of optional devices (peripheral devices such as an AGC) which are based on the user's specification is received and recorded in the version information file 37, the version of programs installed in each of the optional devices can be known.

Since, as described above, data processing is shared by both an equipment controller (EC) for controlling substrate processing equipment and peripheral devices (AGC or the like), the software load applied to the equipment controller of the processing equipment is lowered and thus highly developed processing can be executed. It is then essential to match applications between the processing equipment and peripheral devices. In the present invention, the matching of applications can easily be attained by managing the version information.

As has been described in detail above, according to the present invention, version information based on the user's specification is received from each program and stored in a storing section, and the stored version information is displayed when the need arises; therefore, version information of a program which cannot be recognized can be known from the screen. Since, moreover, error information is received and stored and the stored error information is displayed together with the version information, version information of a program causing an error can easily be known. Since the version information corresponding to the error information, the version information of the program causing an error can be known more easily. When a program is updated, version information is obtained from the program and then stored; therefore, correct version information can always be known.

In the above embodiments, the present invention is directed to a semiconductor manufacturing device; however, it can be applied to other semiconductor manufacturing devices such as a clean track and an LCD manufacturing device.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A control apparatus connected to substrate processing equipment for controlling the same, the control apparatus comprising:

a version information section configured to extract version information from a plurality of programs including a program for controlling substrate processing equipment for processing a substrate, the version information according to a user specification;

a version information storage configured to store the version information extracted by the version information section; and a display configured to display the version information stored in the version information storage.

2. The control apparatus according to claim 1, wherein the version information section includes a detector configured to detect a version of a program of the plurality of programs which is unrecognizable by the display.

3. The control apparatus according to claim 1, wherein the version information section has a function for obtaining the version information from a program when the program is updated and storing the version information in the version information storage.

4. The control apparatus according to claim 3, wherein the version information section includes a detector configured to detect a version of a program of the plurality of programs which is unrecognizable by the display.

5. The control apparatus according to claim 1, further comprising:

an error information section configured to obtain error information of an error caused when each of the plurality of programs is executed; and an error information storage configured to store the error information received from the error information section.

6. The control apparatus according to claim 5, wherein the version information section includes a detector configured to detect the version information from a program when the program is updated and store the version information in the version information storage.

7. The control apparatus according to claim 5, wherein the version information section has a function for detecting a version of a program of the plurality of programs which is unrecognizable by the display.

8. The control apparatus according to claim 5, wherein the display displays the error information and the version information corresponding thereto read out from the error information storage.

9. The control apparatus according to claim 8, wherein the version information section has a function for detecting the version information from a program when the program is updated and storing the version information in the version information storage.

10. The control apparatus according to claim 1, wherein said version information section includes a device configured to receive the version information based on a user's specification.

11. A control apparatus connected to substrate processing equipment for controlling the same, comprising:

an execution section configured to execute a program for controlling substrate processing equipment for processing a substrate;

a log management section configured to execute a program for collecting log information;

a version information collection section configured to collect version information from programs, the version Information according to a user specification; and a display configured to display the version information.

12. The control apparatus according to claim 11, wherein said version information section includes a device configured to receive the version information based on a user's specification.

13. A control apparatus connected to substrate processing equipment for controlling the same, comprising:

a master control section configured to execute a plurality of programs including a program for controlling the substrate processing equipment for processing a substrate; and a plurality of slave control sections controlled individually by the master control section, the master control section including;

a version information section configured to extract version information from a plurality of programs, the version information according to a user specification;

a version information storage configured to store the version information received form the version information section; and a display configured to display the version information stored in the version information storage.

14. The control apparatus according to claim 13, wherein said version information section includes a device configured to receive the version information based on a user's specification.

15. A control apparatus connected to substrate processing equipment for controlling the same, comprising:

a control section configured to execute a plurality of programs including a program for controlling the substrate processing equipment for processing a substrate; and at least one peripheral device configured to execute a program in association with the control section to control the substrate processing equipment, the control section including;

a version information section configured to extract version information from the plurality of programs and the program executed by the peripheral device, the version information according to a user specification;

a storage configured to store the version information received from the version information section; and a display configured to display the version information stored in the version information storage.

16. The control apparatus apparatus to claim 15, wherein said version information section includes a device configured to receive the version information based on a user's specification.

17. Substrate processing equipment comprising:

a plurality of cassette chambers having respective cassettes configured to hold a number of substrates;

a plurality of process chambers configured to subject each of said substrate to various processes;

a transfer unit configured to transfer the substrates between said process chambers and said cassette chambers;

a plurality of slave controllers configured to execute a plurality of programs for individually controlling said process chambers, said cassette chambers and said transfer unit; and a master controller configured to control said slave controllers, which comprises a version information section configured to extract version information from the plurality of programs including a program for controlling said process chambers, the version information according to a user specification, a version information storage configured to store the version information extracted by the version information section, and a display configured to display the version information stored in the version information storage.

18. Substrate processing equipment comprising:

a plurality of cassette chambers having respective cassettes configured to hold a number of substrates;

a plurality of process chambers configured to subject each of said substrate to various processes;

a transfer unit configured to transfer the substrates between said process chambers and said cassette chambers;

a plurality of slave controllers configured to execute a plurality of programs for individually controlling said process chambers, said cassette chambers and said transfer unit; and a master controller configured to control said slave controllers, which comprises an execution section configured to execute a program for controlling said slave controllers, a log management section configured to execute a program for collecting log information, a version information collection section configured to collect version information from the programs, the version information according to a user specification, and a display configured to display the version information stored in the version information storage.

19. The control apparatus according to claim 1, which includes a notification device configured to notify replacing the program in which an error has occurred with a program of new version.

20. The control apparatus according to claim 1, which includes a providing device configured to provide the version information using at least one of a recording medium and a communication medium.

21. A control apparatus connected to substrate processing equipment for controlling the same, the substrate processing equipment including a plurality of processing units which subject the substrate to various processes, the control apparatus comprising:

an execution section configured to execute a plurality of programs for individually controlling the processing units;

a version information section configured to extract respective version information from the plurality of programs;

a version information storage configured to store the version information extracted by the version information section; and a display configured to display the version information stored in the version information section.

22. A control apparatus connected to substrate processing equipment for controlling the same, the substrate processing equipment including a plurality of processing units which subject the substrate to various processes, the control apparatus comprising:

an execution section configured to execute a plurality of programs for individually controlling the processing units;

a log management section configured to execute a program for collecting log information;

a version information collection section configured to collect version information from the programs; and a display configured to display the version information stored in the version information section.

23. A control apparatus connected to substrate processing equipment for controlling the same, the substrate processing equipment including a plurality of processing units which subject the substrate to various processes, the control apparatus comprising:

a plurality of slave control sections configured to execute a plurality of programs for individually controlling the processing units;

a master control section configured to control said slave control sections the master control section including:

a version information section configured to extract version information from the plurality of programs;

a version information storage configured to store the version information received from the version information section; and a display configured to display the version information.

24. A control apparatus connected to substrate processing equipment for controlling the same, the substrate processing equipment including a plurality of processing units which subject the substrate to various processes, the control apparatus comprising:

a control section configured to execute a plurality of programs including a plurality of programs for individually controlling the processing units; and at least one peripheral device configured to execute a program in association with the control section to control the substrate processing equipment, the control section including:

a version information section configured to extract version information from the plurality of programs and the program executed by the peripheral device;

a storage configured to store the version information received from the version information section; and a display configured to display the version information.

* * * * *